United States Patent [19]

Lepage et al.

[11] Patent Number: 5,966,408
[45] Date of Patent: Oct. 12, 1999

[54] METHOD AND DEVICE FOR REGENERATING BY MAXIMA DETECTION, A CLOCK SIGNAL PUNCTUATING THE TRANSMISSION OF RECEIVED DIGITIZED SIGNALS

[75] Inventors: Thierry Lepage, Noisy le Roi; Claude Beauducel, Henonville, both of France

[73] Assignee: Institut Francais du Petrole, Rueil-Maison, France

[21] Appl. No.: 08/601,355

[22] Filed: Feb. 16, 1996

[30] Foreign Application Priority Data

Feb. 17, 1995 [FR] France ................................ 95 01955

[51] Int. Cl.⁶ .............................. H04L 25/34; H04L 25/49
[52] U.S. Cl. ......................... 375/286; 375/355; 370/516; 327/58
[58] Field of Search .................................. 375/286, 289, 375/293, 294, 354, 362, 371, 373, 374, 376; 370/503, 516, 520; 327/58, 60, 62

[56] References Cited

U.S. PATENT DOCUMENTS 3,820,015   6/1974   Puckette .

FOREIGN PATENT DOCUMENTS

| 0541431 | 5/1993 | European Pat. Off. . |
| 2598868 | 11/1987 | France . |
| 2269727 | 2/1994 | United Kingdom . |
| 93/01667 | 1/1993 | WIPO . |

*Primary Examiner*—Tesfaldet Bocure
*Assistant Examiner*—Bryan Webster
*Attorney, Agent, or Firm*—Antonelli, Terry, Stout & Kraus, LLP

[57] ABSTRACT

In order to restore a clock signal that has been used for coding digitized signals transmitted on a transmission channel, such as a line, the case when the received signals are distorted, the times (ti) when the signals go through their maxima (M) are detected with precision through an analysis of a series of samples (Ep) taken from the signals received during a time "window" (W) positioned with reference to a local clock. A device determines the amplitude differences between the successive samples and compares the difference configuration as obtained with predetermined standard configurations representative of forms that are acceptable for the maxima. In case when the difference configuration corresponds to no recognized standard configuration, the frequency of the local clock is changed so as to re-establish a sufficient similarity with a standard configuration.

24 Claims, 3 Drawing Sheets

METHOD AND DEVICE FOR REGENERATING BY MAXIMA DETECTION, A CLOCK SIGNAL PUNCTUATING THE TRANSMISSION OF RECEIVED DIGITIZED SIGNALS

BACKGROUND OF THE INVENTION

1. Field of the Invention

The present invention relates to an improved method and device for regenerating, from signals received on a transmission channel, a clock signal marking the transmission, on the channel, of digitized and coded data.

2. Description of the Prior Art

In data transmission using clock signals, the digitized data to be transmitted are coded from a predetermined number of different voltages of constant amplitude. 4, 8, 16 or coding symmetrical voltages are for example selected on either side of the zero voltage. With $2^n$ levels for example, n bits can thus be transmitted simultaneously and the transmission rate of a transmission channel can therefore be increased. An application of transmission on a cable using a multilevel coding is described for example in the Assignee's French Patent 2,675,974 for optimizing the signal transfer rates on transmission cables.

The Assignee's French Patent 2,683,411 (EP-541,431) describes a process and a device for restoring a clock signal marking the transmission of signals received on a transmission channel, notably for the radio transmission of seismic signals.

In order to restore the clock signal, the transition times of the signals are detected with precision through an analysis of a series of samples taken from the signals for at least a fraction of the clock period. The amplitude differences between the various successive samples are detected and the obtained difference configuration is compared with standard configurations observed on the transmission channel by means of previous tests and stored in a memory. If the similarity between the measured difference configuration and one of the standard configurations is sufficient, the window is correctly centered. If it is not, a local clock is used for resynchronization.

This prior method works correctly in all the cases where the transitions between the successive levels are sufficiently marked. In the opposite case, which notably occurs when the passband of the transmission channel is incompatible or poorly compatible with the desired transmission rate, the transition zones are too degraded for the configurations of samples taken in each "window" to correspond to a stored standard configuration. The resynchronization of a local clock on the basis of the comparisons performed is therefore more uncertain.

In geophysical exploration operations intended to connect downhole servicing equipments: measuring instruments, well sondes, etc, to a surface control and recording station, transmission cables with a limited passband are generally used, such as multi-conductor electrocarrying cables.

By using the optimization process described in the Assignee's French Patent 2,675,974, the transmission rate of the transmission lines can be optimized in this type of cable. To that effect, correction circuits are placed at the end of a line so that the transfer function of the corrected line corresponds at least within a certain frequency interval to that of a reference filter such as a Bessel filter for example. The presence of these correction circuits allows the transmission rate of the transmission lines to be improved considerably.

However, it has been noticed during transmission tests on this type of cable, either because the transmission rate is not compatible with the natural passband of the lines, or because the correction applied thereto is not optimal, the signals exhibit a horizontal instability (jitter) as they approach zero, as shown in FIG. 1, which makes the transitions between different levels hardly detectable, and their vertices are rounded in the shape of sinusoid vertices, however with a relatively stable position. FIG. 1 highlights this phenomenon.

On the other hand, it has been observed that it is easier to discern when the signals go through their maximum amplitude in a relatively narrow sampling window.

It is well-known that a local clock can be synchronized with the clock that marks the transmission of a signal by detecting the times when the signal derivative with respect to time becomes equal to zero and by adjusting the local clock by means of a locking loop.

However, in the case when the received signal is of the multilevel type, such a detection can lead (see FIG. 3) to an erroneous adjustment of the local clock to intermediate times where the derivative changes sign (points m in FIG. 3) and not to the really representative vertices (vertices M).

SUMMARY OF THE INVENTION

The method according to the invention regenerates, from signals picked up on a transmission channel, a clock signal marking the transmission on the channel of digitized and coded data, so as to synchronize a local clock thereon, while avoiding the uncertainties of the prior method that are linked, under certain circumstances, to the location of the transition times between the signals, by avoiding any adjustment ambiguity.

The invention can be used in bipolar coding transmission systems. It is particularly well-suited to systems for transmitting simultaneously several data elements such as multilevel transmission systems.

The invention positions a time interval or read window of the received signals with reference to the local clock, and comprises locating the vertices of the received signals by selective detection of the times when their derivative becomes equal to zero or changes sign after an increase in an absolute value of the received signals, and possibly recentering the read window on these times by changing the frequency or the phase of the signal of the local clock.

Locating these vertices is for example performed by:

determining the amplitude differences between samples taken on signals during successive read windows, so as to obtain a difference configuration corresponding to each of these windows, comparing each difference configuration obtained with a list of previously recognized and catalogued standard difference configurations corresponding to windows including the sought vertices, and by optionally recentering each read window by applying, to the frequency or to the phase of the signal of the local clock, a predetermined correction associated with each standard configuration of the list, in the case when the difference configuration obtained corresponds to a catalogued standard configuration, this correction concerning for example a division factor of a reference frequency.

The local clock modification can be performed by carrying out the comparison stage only on the received signals whose amplitude of the vertices is higher than a threshold value, or by selecting the vertices whose amplitude is equal to the highest level of the multilevel signals emitted on the transmission channel.

The method can also advantageously comprise measuring the amplitude of the signals substantially at the time corresponding to the middle of each centered or recentered window.

The device according to the invention comprises means for modifying the amplitude of the signals picked up, and means for sampling and for digitizing signals during time intervals or read windows of these signals determined with reference to the local clock, as well as centering means suited to locate vertices of the signals picked up by detection of the times when their derivative becomes equal to zero, and to recenter if need be the read window on these times by changing the frequency or the phase of the signal of the local clock.

The centering means comprises a set intended to form during each window a difference configuration from the amplitude differences between samples taken successively from the signals during the window, and to select difference configurations including the signal derivative going through a zero value after an increase in absolute value of the signals, and comparison elements for comparing each set of differences obtained with a list of standard difference configurations, and for applying to the frequency or to the phase of the signal of the local clock a predetermined correction associated with each standard configuration of the list. These comparison elements of each set of differences can include, for example, means for forming digital words representative of difference configurations between the samples taken from the same window and storage means indicating the correction to be brought about to the frequency or to the phase of the local clock.

The set for forming the difference configurations comprises for example means for determining the direction of the differences between samples that have been successively taken and digitized, and means for locating the maxima by taking account of the sign of the digitized samples.

The local clock comprises in series for example a first division element for dividing a reference frequency by an adjustable division factor, connected to said comparison elements, a second division element with a division factor m, producing a signal at the bit succession frequency, and a third division element with a division factor n, producing a signal at the baud succession frequency.

The device preferably comprises means for selecting the signals whose amplitude exceeds a fixed threshold value, as well as a phasing or locking indicator for a validated signal operating system.

The invention can also include means for detecting the amplitude of the signals received substantially at the time corresponding to the middle of the centered or recentered window.

With the discrimination between the times when the derivative becomes equal to zero while only those really corresponding to positive or negative vertices of the multilevel signals received are retained, it is certain that the reception window eventually centers unequivocally on the vertices and consequently properly phases the local clock.

BRIEF DESCRIPTION OF THE DRAWINGS

Other features and advantages of the method and of the device according to the invention will be clear from reading the description hereafter of embodiments given by way of non limitative examples, with reference to the accompanying drawings in which.

DESCRIPTION OF THE PREFERRED EMBODIMENTS

Figure 1:
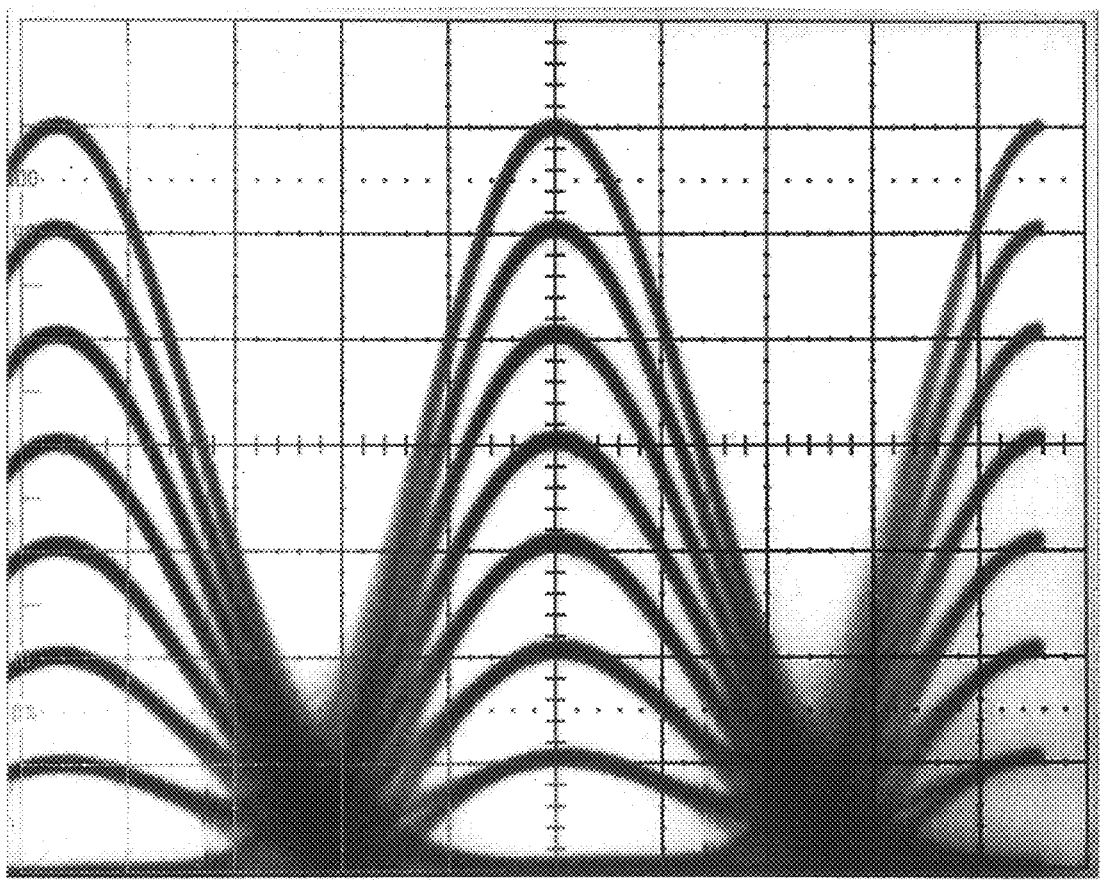
FIG. 1 shows a photograph of a superposition of signals of different amplitudes, detected during a multilevel type transmission on a well transmission cable, where the transition zones between levels are difficult to locate and unsuitable for the detection of the clock signal that mark their transmission, FIG. 2 diagrammatically shows a coded multilevel signal that is applied to a transmission line, FIG. 3 diagrammatically shows the distortions that can affect this signal after a propagation on a line, and FIG. 4 diagrammatically shows an embodiment of the invention.

A multilevel signal is constituted (FIG. 1) from a certain number of voltages of different amplitudes. As it is well known, a particular combination of binary signals that can be transmitted simultaneously on a transmission channel corresponds to each of the successive amplitude stages of the signal. The precise determination of the level of each of the successive stages of the signal received on this channel allows the transmitter binary signals to be restored.

Figure 2:
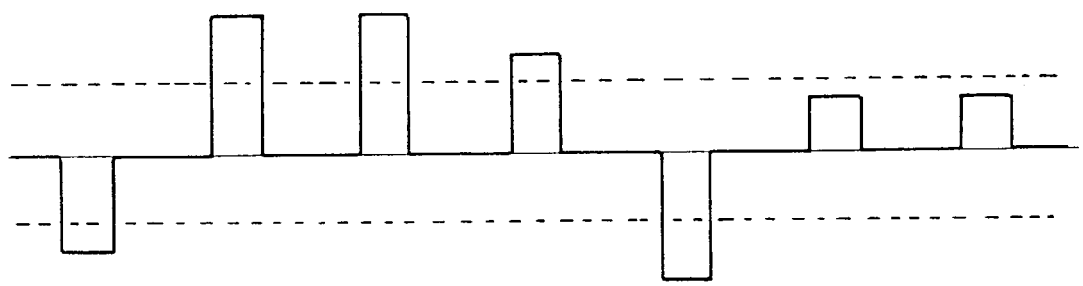
Figure 3:
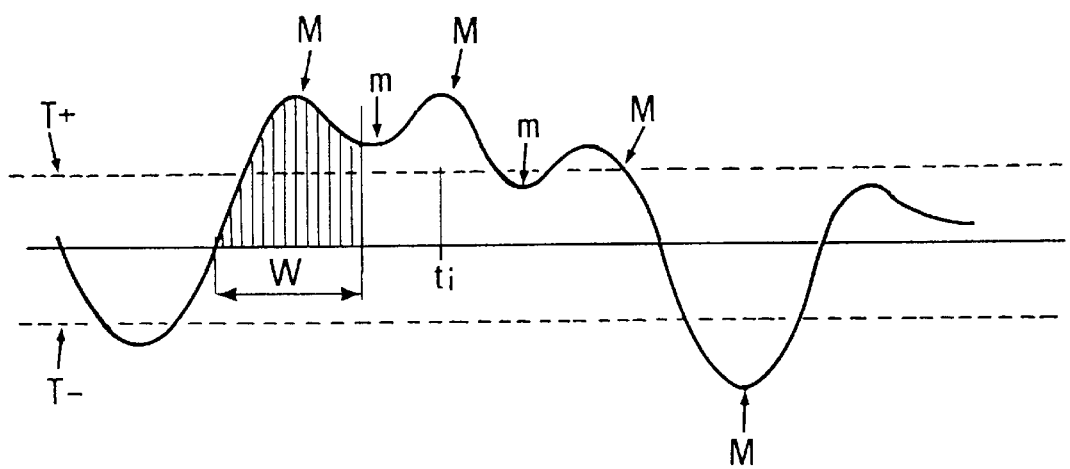

This discrimination of the different levels is more delicate in practice because, after propagation on a transmission channel, with a high transmission rate considering the channel passband, the stages of the initial multilevel signal (FIG. 2) are rounded as schematized in FIG. 3. The stages of the multiband signal are all the more difficult to establish since the number of distinct levels to be recognized is high and the differences between the levels are relatively slight.

In order to avoid any errors in level recognition, it is important that the time when the maximum amplitude reached is measured is well-centered on the successive vertices.

According to the invention, this condition is fulfilled mainly by positioning a window W for reading the received signals with reference to a local clock, by locating vertices M of these signals picked up by detecting the instants when its derivative changes sign or becomes equal to zero, and the read window is centered on these times (or corrected if need be) by changing the frequency or the phase of the signal of the local clock.

The device according to the invention receives coded signals marked by a clock signal on a transmission channel L (FIG. 4) consisting for example of a transmission line, possibly optimized by correction circuits C in accordance with the process described in the above-mentioned patent French Patent 2,675,974. The correction circuits C result in the pulse response width of the cable, when they are connected thereto, having the same order of magnitude as the period of the clock punctuating the baud transmission on line L.

These signals come in coded form, for example in the well-known ANSI code, with evenly distributed polarity reversals so that, within a predetermined time interval, an amplitude maximum and minimum are available, and their DC component is zero.

The positioning of window W is performed by means of a local clock and the centering of the window is mainly achieved with respect to the time ti when the sign change of the signal derivative is detected. Since the horizontal instability or jitter is higher with low-amplitude signals, only those whose amplitude exceeds a certain set threshold T are preferably retained for calculating the derivative, and only the maxima of the absolute value are taken into account, and not the minima m, as shown in FIG. 3.

Figure 4:
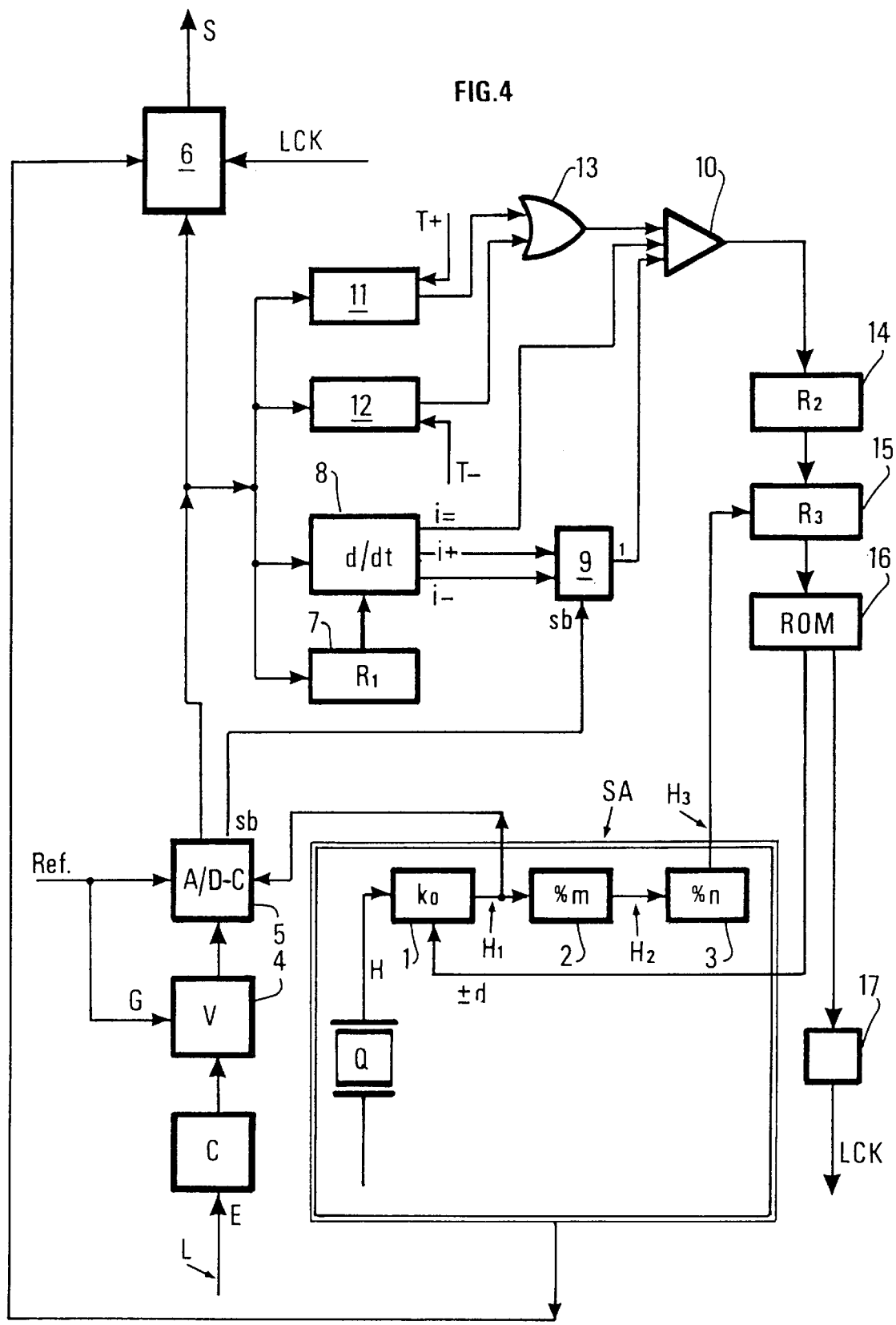

The positioning of the windows is performed for example by the device described hereafter and schematized in FIG. 4.

The device includes a synchronization set SA comprising three frequency division stages 1, 2, 3 connected in series, receiving a high-frequency signal H emitted by a quartz crystal Q. The first division stage 1 applies a division factor k that can range between three values k0, (k0−d) and (k0+d), and produces a first clock signal H1. The second and the third stages 2, 3 apply respectively a second division factor m and a third division factor n, both fixed, and they produce respectively a second and a third clock signal H2, H3. The quartz frequency and the division factors m and n are so selected that the frequency of signal H2 corresponds to the bit reception frequency on line L, and that of signal H3 corresponds to the reception frequency of the signal bauds. The width of window W is selected for example equal to the period of signal H3.

After passing through circuits C, the signals received on line L, coded according to a bipolar code and without DC component, are applied to an automatic gain control (AGC) amplifier 4. After amplification, they are sampled (FIG. 3) and digitized in an analog-to-digital converter A/D-C 5 controlled by clock signal H1. The frequency of this signal H1, which is applied to converter A/D-C 5, is selected to have a sufficiently fine sampled signal resolution. The same reference voltage VR is applied to amplifier 4 and to converter A/D-C 5. The digitized signals are then applied to a signal decoder 6 that measures the successive levels of the multilevel signals received and decodes them so as to reconstitute the data that have been transmitted on the line. It is controlled by the clock signals from set SA.

The permanent recentering of the read window W through the phasing of the signals of the local synchronization set SA with the clock signal mark the transmission on line L is performed as described hereafter, by detecting the times when the derivative changes sign or at least becomes equal to zero, and therefore the position of the successive vertices of the signals.

Each digitized signal sample coming from converter A/D-C 5 is fed into a register 7 and compared with the immediate next one in a comparator 8. The results of these successive comparisons are delivered on three successive outputs according to whether the increments are positive (i+), negative (i−) or zero (i=). The increments i+ and i−, as well as the sign bit sb coming from converter 5 are applied to a maxima detector 9. When it detects a passage to a zero derivative value (i=) following an increase in absolute value of the signal, detector 9 emits a logical 1 indicative of a maximum M, that is applied on an input of an AND gate 10.

The digitized words from converter A/D-C 5 are also applied in parallel to two comparators 11, 12 with respective thresholds T+ and T− (FIG. 3). The threshold detection signals coming from the two comparators are applied, through an OR gate 13, to a second input of AND gate 10. A third input thereof receives the signals i= coming from comparator 8.

The successive bits delivered through the AND gate 10 are formed into digital words (of 12 bits for example) in a shift register R2 (14).

Considering the selection achieved by the previous elements 7 to 13, these words are representative of the amplitude differences between the m.n samples a1 to am.n that are taken successively in each of the windows W that frame a maximum M (FIG. 3).

At a frequency set by the clock signal H2, corresponding to that of each baud transmitted, the words are transferred into a third register R3 (15).

The operation of positioning window W is achieved by checking that the configuration of logical 1 and 0 of each word in register 13 is correct by comparing it with a stored standard list of configurations. If it is not, the frequency or the phase of the local set SA that controls the centering of the window is changed so as to find one later.

This operation is performed here directly by seeking in a memory 16 of the EPROM type, at the address indicated by the word in the third register R3, 2-bit or 4-bit words for example representative of the correction to be possibly applied to the division factor k of frequency divider 1. A monostable multivibrator 17 is connected to memory 16 and it delivers a signal LCK indicating a correct adjustment of the local synchronization set SA with respect to the clock signal received. Three cases may arise:

a) the configuration obtained is not catalogued, in which case the division factor k is not changed and keeps its previous value, b) the configuration obtained corresponds to a good centering of the window and the difference d is eliminated, if it has not been yet, factor k being equal to k0, and c) the configuration is catalogued and the correction d, that is read in the memory location of the EPROM memory and is capable of recentering window W on vertex M according to the signal received by changing the frequency or the phase of the local clock, is applied to factor k.

Certain configurations correspond to cases where the local clock SA is fast in relation to the clock signal transmitted. Other configurations correspond to cases where the local clock is slow. The digital words coming from memory 16 are applied to divider 1 and they determine the good variation in the range d around the value k0 defined above to be applied to the division factor k in order to restore the synchronism.

The height of the threshold T+ and T− chosen for selecting the vertices of the signal can be changed at will according to the quality of the signals received. It is for example possible for a multilevel signal to detect only when the signal goes through the maximum level. The frequency of the possible recentering operations is thus decreased but, on the other hand, the selection device can be simplified since the minima are automatically excluded.

The detection of each maximum is performed by signal decoder 6. As it receives the adjustment signal emitted by monostable multivibrator 17, it dephases by a half-period the signal H3 marking the bauds succession and it acquires for example the signal sample that is the closest to the rising front of the phase-shifted signal H3 that marks each time ti (FIG. 3).

The EPROM memory used for storing the corrections to be applied to the signal of the local clock SA lends itself well and easily to modifications to the list of standard configurations and to possible corrections to be brought. However, a processor programmed to perform the required corrections can for example be used instead without departing from the scope of the invention.

The sensitivity of the device to the phase-shift variations between the signals of the local clock and of the clock detected on line L is determined through the difference d applicable to the division factor k of every baud and therefore every n.m.k period of the signal H of the local clock. The factor k has to be very great so that the effect of the variation d=1 applied remains limited (of the order of 2% to 5%), which implies a very high frequency for the signal H. It is however possible to limit this frequency providing that the correction is only applied every n.m of the signal H3 (baud periods) so as to reduce the division factor k in the same proportion.

We claim:

1. A method of synchronizing a local clock with a clock signal marking transmission of multilevel signals representing digitized and coded data received on a transmission channel comprising:

positioning a time interval within the multilevel signals with reference to the local clock by locating vertices of the multilevel signals by selective detection of times when a derivative of the signals becomes zero or changes sign after an increase in absolute value of the signals and; wherein the locating of vertices of the multilevel signal is performed by determining any amplitude differences between samples taken from the signals during successive time intervals, to obtain a difference configuration corresponding to each of the time intervals, comparing each difference configuration obtained with a list of previously recognized and catalogued standard difference configurations corresponding to time intervals including vertices, and recentering at least one time interval by applying, to one of frequency or phase of clock signals of the local clock a predetermined correction associated with each standard configuration of the list, when the difference configuration obtained corresponds to a catalogued standard configuration.

2. A method as claimed in claim 1, wherein the recentering of the local clock is performed by carrying out a comparison stage only on received signals with vertices having an amplitude higher than a threshold value.

3. A method as claimed in claim 2, wherein the recentering of the local clock is performed by selecting the vertices whose amplitude is equal to a highest level of the multilevel signals received on the transmission channel.

4. A method as claimed in claim 1, further comprising measuring an amplitude of the signals substantially at a time corresponding to a middle of each time interval.

5. A method as claimed in claim 2, further comprising measuring an amplitude of the signals substantially at a time corresponding to a middle of each time interval.

6. A method as claimed in claim 1, comprising changing the frequency or the phase of the clock signals of the local clock by applying a correction to a division factor of a reference frequency.

7. A method as claimed in claim 6, further comprising selecting an application frequency of the correction to the division factor.

8. A device for synchronizing a local clock with a clock signal marking transmission of multilevel signals representing digitized and coded data received on a transmission channel, comprising:

an amplifier for changing an amplitude of the signals;

a circuit for sampling and digitizing the signals during time intervals of the signals with reference to clock signals of the local clock;

a circuit for detecting an increase in absolute value of the signals;

a circuit, coupled to the circuit for detecting an increase in absolute value, for locating vertices of the signals by detecting times when the derivative of the signals becomes equal to zero after detection of an increase in absolute value of the signals by the circuit for detecting an increase of absolute value of the signals, and the circuit for locating vertices forming, during each time interval, a difference configuration from amplitude differences between samples taken successively from the signals during the time interval and selecting difference configurations when the derivative of the signals goes through a zero value after detecting an increase in absolute value of the signals; and comparison elements which compare each difference configuration obtained with a list of standard difference configurations and apply to one of frequency or phase of the clock signals of the local clock a predetermined correction associated with each standard configuration of the list of standard difference configurations.

9. A device as claimed in claim 8, wherein the circuit for locating vertices forms the difference configurations, determines a direction of differences between samples that have been successively taken and digitized, and locates maxima for taking into account a sign of the digitized samples.

10. A device as claimed in claim 8, wherein the comparison elements form digital words representative of difference configurations between the samples taken in a same time interval and further comprising a storage containing corrections to be made to the frequency or to the phase of the clock signals of the local clock.

11. A device as claimed in claim 8, wherein the local clock comprises in series a first division element for dividing a reference frequency by an adjustable division factor, connected to the comparison elements, a second division element with a division factor m producing a signal at a bit succession frequency and a third division element with a division factor n producing a signal at a baud succession frequency.

12. A device as claimed in claim 9, wherein the local clock comprises in series a first division element for dividing a reference frequency by an adjustable division factor, connected to the comparison elements, a second division element with a division factor m producing a signal at a bit succession frequency and a third division element with a division factor n producing a signal at a baud succession frequency.

13. A device as claimed in claim 10, wherein the local clock comprises in series a first division element for dividing a reference frequency by an adjustable division factor, connected to the comparison elements, a second division element with a division factor m producing a signal at a bit succession frequency and a third division element with a division factor n producing a signal at a baud succession frequency.

14. A device as claimed in claim 8, further comprising a circuit for selecting signals having an amplitude exceeding a fixed threshold value.

15. A device as claimed in claim 9, further comprising a circuit for selecting signals having an amplitude exceeding a fixed threshold value.

16. A device as claimed in claim 10, further comprising a circuit for selecting signals having an amplitude exceeding a fixed threshold value.

17. A device as claimed in claim 8, further comprising a circuit for detecting an amplitude of the signals received substantially at a time corresponding to a middle of the time interval.

18. A device as claimed in claim 9, further comprising a circuit for detecting an amplitude of the signals received substantially at a time corresponding to a middle of the time interval.

19. A device as claimed in claim 10, further comprising a circuit for detecting an amplitude of the signals received substantially at a time corresponding to a middle of the time interval.

20. A device as claimed in claim 8, comprising an indicator of phasing or locking for a validated signal operating system.

21. A device as claimed in claim 9, comprising an indicator of phasing or locking for a validated signal operating system.

22. A device as claimed in claim 10, comprising an indicator of phasing or locking for a validated signal operating system.

23. A method of synchronizing a local clock with a clock signal marking transmission of multilevel signals representing digitized and coded data received on a transmission channel comprising:

positioning a time interval within the multilevel signals with reference to clock signals of the local clock by locating vertices of the multilevel signals by selective detection of times when a derivative of the signals changes sign after an increase in absolute value of the signals.

24. A device for synchronizing a local clock with a clock signal marking transmission of multilevel signals representing digitized and coded data received on a transmission channel, comprising:

an amplifier for changing an amplitude of the signals;

a circuit for sampling and digitizing the signals during time intervals of the signals with reference to clock signals of the local clock;

a circuit for detecting an increase in absolute value of signals;

a circuit, coupled to the circuit for detecting an increase in absolute value, for locating vertices of the signals by detecting times when the derivative of the signals becomes equal to zero, after a detection of an increase in absolute value of the signals by the circuit for detecting an increase in absolute value; and a circuit, responsive to the located vertices, for synchronizing the clock signals of the local clock.

* * * * *